US012607745B2

(12) United States Patent
Frey et al.

(10) Patent No.: US 12,607,745 B2
(45) Date of Patent: Apr. 21, 2026

(54) REDUCED-SIZE FMCW HETERODYNE-DETECTION LIDAR IMAGER SYSTEM

(71) Applicant: Commissariat A L'Energie Atomique et aux Energies Alternatives, Paris (FR)

(72) Inventors: Laurent Frey, Grenoble Cedex (FR); Anis Daami, Grenoble Cedex (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 883 days.

(21) Appl. No.: 17/933,971

(22) Filed: Sep. 21, 2022

(65) Prior Publication Data

US 2023/0109281 A1 Apr. 6, 2023

(30) Foreign Application Priority Data

Oct. 5, 2021 (FR) ...................................... 21 10497

(51) Int. Cl.
 *G01S 17/34* (2020.01)
 *G01S 7/481* (2006.01)
 *G01S 17/89* (2020.01)
(52) U.S. Cl.
 CPC ............. *G01S 17/34* (2020.01); *G01S 7/4814* (2013.01); *G01S 17/89* (2013.01)
(58) Field of Classification Search
 CPC ........ G01S 17/34; G01S 7/4814; G01S 17/89; G01S 7/4816; G01S 7/4917
 See application file for complete search history.

(56) References Cited

U.S. PATENT DOCUMENTS

| | | | |
|---|---|---|---|
| 6,646,723 B1 * | 11/2003 | Dubovitsky | .......... G01S 7/4915 |
| | | | 356/485 |
| 2020/0011994 A1 | 1/2020 | Thorpe et al. | |
| 2021/0349196 A1 * | 11/2021 | Wang | ...................... G01S 7/484 |

OTHER PUBLICATIONS

French Preliminary Search Report and Written Opinion Issued May 25, 2022 in French Application 21 10497 filed on Oct. 5, 2021 (with English Translation of Categories of Cited Documents), 12 pages.

(Continued)

*Primary Examiner* — Robert W Hodge
*Assistant Examiner* — Robert W Vasquez
(74) *Attorney, Agent, or Firm* — Oblon, McClelland, Maier & Neustadt, L.L.P.

(57) ABSTRACT

The invention relates to a reduced-size FMCW lidar imager system. The imager system comprises an optical source 10 for a coherent, continuous and frequency-modulated primary signal $S_p$ in order to illuminate the scene 2; an optical collection element 41 configured to collect a backscattered signal $S_{ret,c}$; a photodetector 50 intended to receive a heterodyne signal $S_h$ associated with the collected signal $S_{ret,c}$; and a processing unit 60 configured to determine the distance $z_{sc}$ from the scene based on a beat frequency of the heterodyne signal $s_h$. It is configured to fully direct the primary signal $S_p$ to the scene 2. It additionally comprises a reflector 42 configured to reflect a portion $S_{pr,nc}$, called uncollected signal $S_{ret,nc}$, of the backscattered signal $S_{ret}$, not collected by the optical collection element 41, in the direction of the scene 2.

10 Claims, 8 Drawing Sheets

(56)  References Cited

OTHER PUBLICATIONS

Sandborn, Phillip, "FMCW Lidar: Scaling to the Chip-Level and Improving Phase-Noise-Limited Performance," Electrical Engineering and Computer Sciences University of California at Berkeley, Technical Report No. UCB/EECS-2019-148, heep://www2.eecs.berkeley.edu/Pubs/TechRpts/2019/EECS-2019-148.html, 2019, 90 pages.

* cited by examiner 41
42
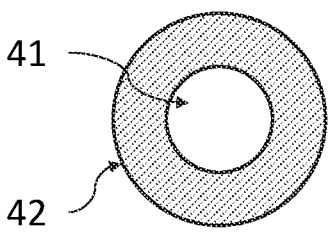
Fig.5A
41     42
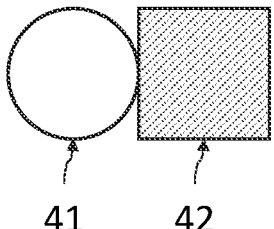
41     42
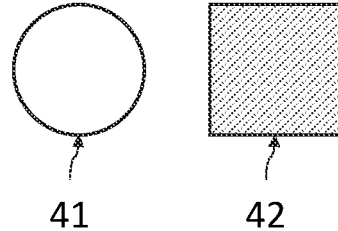
Fig.5B
50   51    42
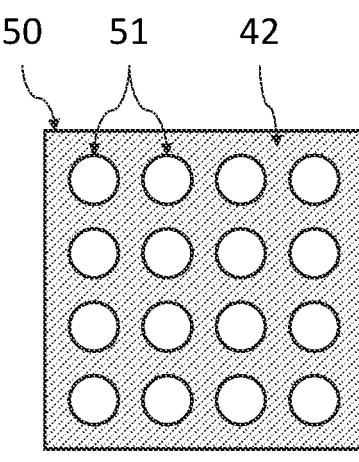
42     42.2     42.1
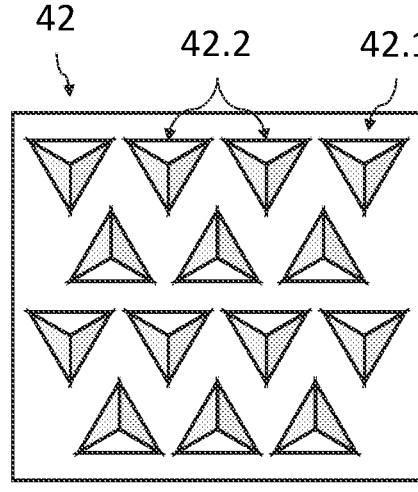
Fig.5C        Fig.5D

REDUCED-SIZE FMCW HETERODYNE-DETECTION LIDAR IMAGER SYSTEM

TECHNICAL FIELD

The field of the invention is that of frequency-modulated continuous wave (FMCW) heterodyne-detection lidar imager systems.

PRIOR ART

FMCW heterodyne-detection lidar imager systems make it possible to determine a distance from a scene illuminated by a coherent optical signal. Such an imager system is based on the principle of heterodyne detection, in the sense that use is made of the properties of a heterodyne signal formed by the interference between two mutually coherent optical signals having an optical path difference, specifically usually a reference signal and a signal backscattered by the scene. These two optical signals are mutually coherent in that they originate from one and the same optical signal, called primary signal, emitted by an optical source. The document by Sandborn entitled *FMCW Lidar: Scaling to the Chip-Level and Improving Phase-Noise-Limited Performance*, EECS Department, University of California, Berkeley, Technical Report No. UCB/EECS-2019-148; Dec. 1, 2019, and the document US 2020/011994 A1 describe various examples of FMCW LIDAR imaging systems.

In this regard, document WO2021/144357 A1 describes one example of such an imager system, called a flash imager system here in that it is designed to illuminate a plurality of points of the scene simultaneously and to determine therefrom a distance map (distance image).

FIG. 1 is a schematic and partial view of such an imager system 1. It comprises at least:

an optical source 10 for what is called the primary signal $S_p$, which is coherent, continuous and frequency-modulated;

an optical splitting and recombining device 20, comprising an optical splitter element 21 designed to divide the primary signal $S_p$ into an object signal $S_o$ directed toward the scene 2 and into a reference signal $S_r$ directed toward a photodetector 50; an optical shaping element 22 for shaping the reference signal $S_r$; and an optical recombiner element 23 designed to direct the reference signal $S_r$ along with a portion $S_{or,c}$ of the backscattered object signal $S_{or}$ toward the photodetector 50 along one and the same optical axis;

an optical projection device 30, designed to project the object signal $S_o$ in order to illuminate the whole scene 2 simultaneously;

an optical imaging device 40, designed to transmit the collected portion $S_{or,c}$ of the backscattered object signal $S_{or}$ and to form the image of the illuminated scene 2 in the detection plane of the photodetector 50. It comprises an optical collection element that collects the light beams defining the portion $S_{or,c}$ of the backscattered object signal $S_{or}$;

the photodetector 50, here a matrix photodetector, designed to receive the collected portion $S_{or,c}$ of the backscattered object signal $S_{or}$ and the reference signal $S_r$, which interfere so as to form a heterodyne signal $S_n$ having a beat frequency $f_b$;

a processing unit 60, designed to determine a distance $z_{sc}$ (and here a distance map) from the scene 2 based on the beat frequency $f_b$ of the heterodyne signal $S_h$.

The primary signal $S_p$ exhibits an instantaneous frequency variation, with for example a starting frequency $f_0$ and a variation in value B (called a chirp) over a period T. The primary signal $S_p$, said to be chirped, is a sinusoidal wave the instantaneous frequency of which evolves linearly over time here. It is divided so as to form the reference signal $S_r$ and the object signal $S_o$, in which the first does not pass through the scene 2 and has an optical path that is fixed and independent of the distance $Z_{sc}$ to be determined. This is commonly called reference signal $S_r$ of a local oscillator.

The photodetector 50 thus receives the reference signal $S_r$ along with the backscattered and collected object signal $S_{or,c}$, which is an attenuated and delayed replica of the object signal $S_o$ with a delay τ. The delay is expressed by a frequency difference $f_b$ between the two signals within the interval [τ; T], where T>>τ, and τ=$2z_{sc}$/c in approximate terms when ignoring the path of the reference signal $S_r$, where c is the speed of light in a vacuum. This frequency $f_b$, called beat frequency, is equal to the difference between the frequency of the reference signal $S_r$ and the backscattered and collected object signal $S_{or,c}$. Its value may be determined in the time domain by counting the number of oscillations of the heterodyne signal $S_h$ over the period T, or in the frequency domain through a fast Fourier transform.

It is then possible to determine, based on the value of this beat frequency $f_b$, the distance $z_{sc}$ between the illuminated scene 2 and the matrix photodetector 50. Indeed, in the knowledge that $f_b$/B=τ/T, and that τ=$2z_{sc}$/c, the distance $z_{sc}$ from the scene 2 is expressed by the relationship: $z_{sc} \approx f_b cT/2B$.

It should be noted that the imager system may have a Mach-Zehnder architecture in which the optical splitter and recombiner elements 21 and 23 are physically separate, or a Michelson architecture in which only one optical element provides the splitting and recombining functions. As described in document WO2021/144357A1, the optical splitting and recombining device may have a free-space configuration and comprise in particular semi-reflective plates and/or splitter cubes, or may have a guided-optic configuration and comprise in particular waveguides and diffraction gratings. Whatever the case, there is a need to reduce the size of such imager systems.

DISCLOSURE OF THE INVENTION

The invention aims to at least partially rectify the drawbacks of the prior art, and more particularly to propose an FMCW heterodyne-detection lidar imager system of reduced size, in particular that does not comprise an optical splitting/recombining device.

For this purpose, the subject of the invention is an FMCW lidar imager system, designed to determine a distance $z_{sc}$ between itself and a scene, comprising: an optical source designed to emit a coherent, continuous and frequency-modulated primary signal $S_p$ in order to illuminate the scene; an optical collection element designed to collect a portion, called collected signal $S_{ret,c}$, of a signal $S_{ret}$ backscattered by the scene and originating from the primary signal $S_p$; a photodetector intended to receive a heterodyne signal $S_h$ associated with the collected signal $S_{ret,c}$; a processing unit designed to determine the distance $z_{sc}$ from the scene based on a beat frequency of the heterodyne signal $S_h$.

According to the invention, it is designed to fully direct the primary signal $S_p$ to the scene. It therefore does not comprise any optical splitting element designed to divide the primary signal $S_p$ into a reference signal $S_r$ that is directed toward the photodetector without passing through the scene, and into an object signal $S_o$ that is directed toward the scene. This is expressed by the fact that the primary signal incident on the scene has an optical power equal to that which it has at the output of the optical source. It additionally comprises a reflector designed to reflect a portion $S_{pr,nc}$, called uncollected signal $S_{ret,nc}$, of the backscattered signal $S_{ret}$, not collected by the optical collection element, in the direction of the scene. Therefore, the collected portion $S_{pr,c}$ of the backscattered signal $S_{pr}$ is then formed of first light beams $S_{ret,c(1)}$ that have not been reflected by the reflector and of second light beams $S_{ret,c(2)}$ that have been reflected by the reflector, and the heterodyne signal $S_h$ is then formed by the interference between the first light beams $S_{ret,c(1)}$ and the second light beams $S_{ret,c(2)}$.

Let us note here that the second light beams $S_{ret,c(2)}$, having been reflected by the reflector, belong to the collected part $S_{ret,c}$ of the backscattered signal $S_{ret}$, and that this backscattered signal $S_{ret}$ is a signal backscattered by the scene. It is then understood that the second light beams $S_{ret,c(2)}$ have been reflected by the scene before being collected.

Some preferred but non-limiting aspects of this imager system are as follows.

The reflector may be retroreflective, so as to reflect incident light beams in the direction of the scene along an axis of reflection identical to their axis of incidence.

The reflector may have a lateral edge located at a maximum distance $r_{max}$ from an optical axis of the optical collection element, and be dimensioned such that the maximum distance $r_{max}$ is less than $\sqrt{(cz_{sc}/B)}$ when the reflector is retroreflective, where c is the speed of light in a vacuum, and B is a variation in the frequency of the primary signal $S_p$ over a period T of the modulation, and such that the maximum distance $r_{max}$ is less than $\sqrt{(cz_{sc}/3B)}$ when the reflector is not retroreflective.

The reflector may be located in the plane of the optical collection element.

The reflector may be located downstream of the optical collection element at the photodetector.

In general, the reflector may be formed of a continuously reflective or retroreflective surface, or may be formed of non-contiguous reflective or retroreflective surfaces separated from each other by a surface transparent or reflective to the wavelength of the optical signals of interest.

The reflector may be located upstream of the optical collection element with an optical collection axis that passes through it, the reflector then being formed of reflective or retroreflective surfaces separated from one another and surrounded by a surface transparent to the wavelength of the primary signal $S_p$.

The reflector may comprise a central surface that is passed through by the optical collection axis, wherein it is formed of reflective or retroreflective surfaces separated from one another and surrounded by a transparent surface, and a peripheral surface that surrounds the central surface, wherein the reflective or retroreflective surfaces are joined to one another.

The imager system may be designed to illuminate only one point of the scene. As a variant, it may be designed to simultaneously illuminate a plurality of points of the scene and then comprise an optical projection device for projecting the primary signal $S_p$ onto the scene in order to simultaneously illuminate the plurality of points of the scene and an optical imaging device designed to form an image of the illuminated scene in the plane of the photodetector.

The imager system may have what is called a monostatic configuration in which an optical axis of the illumination of the scene by the primary signal $S_p$ is identical to an optical collection axis of the optical collection element, and comprise a semi-reflective plate or a splitter cube transmitting the primary signal $S_p$ toward the scene and reflecting the backscattered signal $S_{ret}$ toward the photodetector.

The imager system may have what is called a bistatic configuration in which an optical axis of the illumination of the scene by the primary signal $S_p$ is different from an optical collection axis of the optical collection element.

BRIEF DESCRIPTION OF THE DRAWINGS

Other aspects, aims, advantages and features of the invention will become more clearly apparent on reading the following detailed description of preferred embodiments thereof, this description being given by way of non-limiting example and with reference to the appended drawings, in which:

FIGS. 4A to 4C illustrate one numerical example of determining the beat frequency $f_b$ of the heterodyne signal $S_h$, in the case of an imager system according to one example from the prior art (FIG. 4A), in the case of an imager system according to one embodiment (FIG. 4B), in which FIG. 4C shows the power spectral density, highlighting the beat frequency $f_b$ in these two cases;

FIGS. 5A to 5D are schematic views of examples of the reflector of an imager system according to one embodiment, in which the reflector is a ring surrounding the optical collection element (FIG. 5A); is a square joined to or remote from the optical collection element (FIG. 5B); is located at the photodetector (FIG. 5C); is formed of retroreflective surfaces separated from one another by a transparent surface (FIG. 5D);

DETAILED DESCRIPTION OF PARTICULAR EMBODIMENTS

Figure 1:
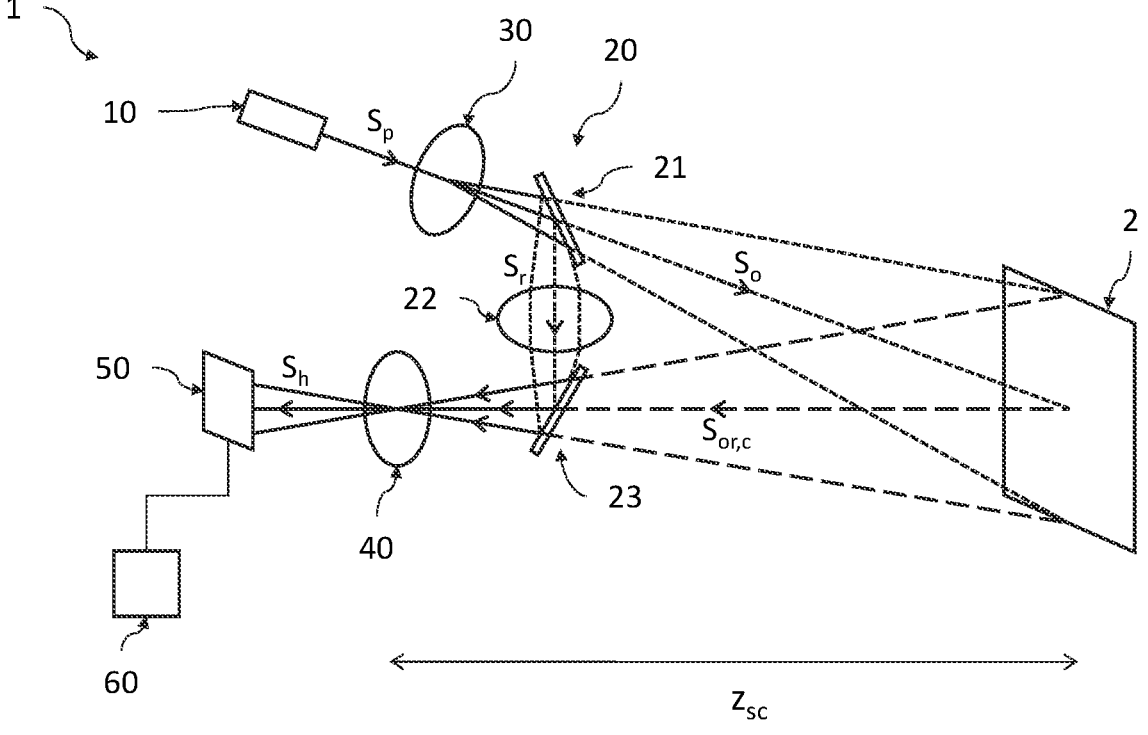
FIG. 1, which has already been described, is a schematic and partial view of a flash imager system according to one example from the prior art.

In the figures and in the remainder of the description, the same references have been used to designate identical or similar elements. In addition, the various elements have not been shown to scale for the sake of clarity of the figures. Moreover, the various embodiments and variants are not mutually exclusive and may be combined with one another. Unless indicated otherwise, the terms "substantially", "approximately" and "of the order of" mean to within 10%, and preferably to within 5%. Moreover, the terms "between . . . and . . . " and the like mean that the bounds are included, unless indicated otherwise.

The invention relates to a frequency-modulated continuous wave (FMCW) heterodyne-detection lidar imager system for determining a distance $z_{sc}$ from a scene, or even a distance map $z_{sc(i,j)}$ (distance image), of reduced size insofar as it does not comprise any optical splitting/recombining device, such as the one from the prior art.

As described in detail further below, the imager system is then designed to fully direct the primary signal $S_p$ to the scene in order to illuminate it. It additionally comprises a reflector for collecting, in addition to light beams $S_{ret,c(1)}$ that have not been reflected by the reflector and that are called a first echo, second light beams $S_{ret,c(2)}$ that have been reflected by the reflector and that are called a second echo. The distance $z_{sc}$ from the scene is then determined based on a beat frequency $f_b$ of the heterodyne signal $S_h$, this being formed by the interference of the first echo $S_{ret,c(1)}$ and of the second echo $S_{ret,c(2)}$, and no longer by interference between the reference signal $S_r$ of a local oscillator and the backscattered object signal $S_{or}$.

The imager system is called a lidar (acronym for light detection and ranging) imager system in that a coherent optical signal is used to determine a distance $z_{sc}$ from a point of the scene or a distance map $z_{sc(i,j)}$ of the scene. In the context of the invention, the imager system may be either of single-point type, in the sense that the optical signal illuminates only one point of the scene, possibly with spatial sweeping of the scene by the optical signal, or of flash type, in the sense that the optical signal simultaneously illuminates multiple points of the scene and that the imager system acquires the image of the scene in order to determine a distance map therefrom. In the context of the invention, the optical signal that illuminates the scene is the primary signal $S_p$, and no longer the object signal $S_o$ as in the prior art.

In addition, the imager system is said to be a heterodyne-detection imager system in that, to determine the distance from the illuminated scene, what is called a beat frequency of a heterodyne signal formed by the interference between two mutually coherent signals having an optical path difference is determined. Unlike the prior art, in which the two optical signals are the reference signal $S_r$ (resulting from the division of the primary signal $S_p$ to form the reference signal $S_r$ and the object signal $S_o$) and the backscattered object signal $S_{or}$, in the context of the invention, the two optical signals are both signals backscattered by the scene, specifically the first echo $S_{ret,c(1)}$ that has not been reflected by the reflector, and the second echo $S_{ret,c(2)}$ that has been reflected by the reflector. These two optical signals $S_{ret,c(1)}$ and $S_{ret,c(2)}$ remain mutually coherent since they originate from the same primary signal $S_p$ emitted by the optical source. Finally, the heterodyne detection is FMCW heterodyne detection in that the primary signal $S_p$ is a continuous and frequency-modulated signal.

Figure 2A:
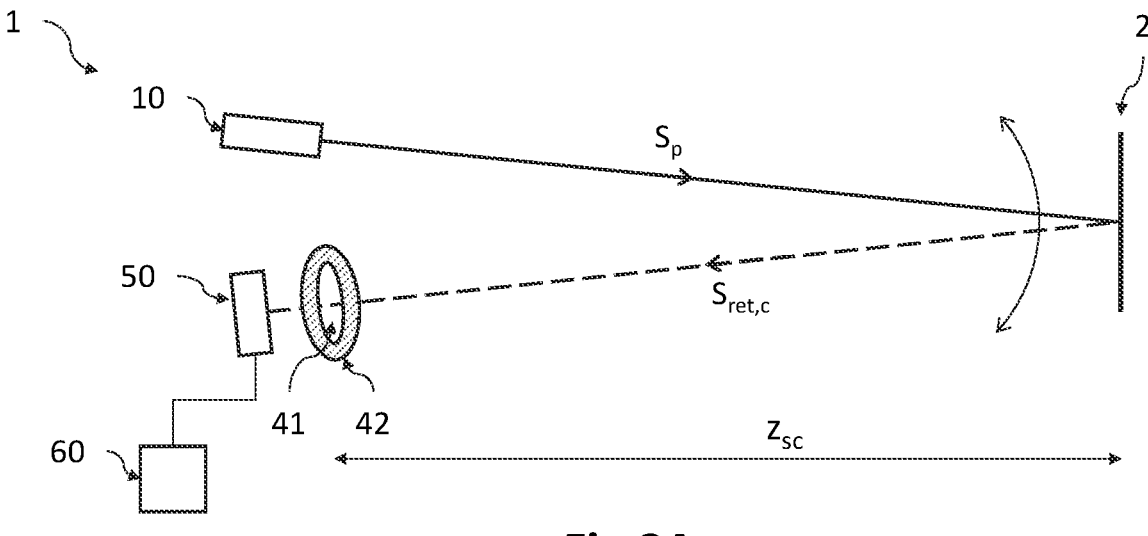
FIGS. 2A and 2B are schematic and partial views of imager systems according to some embodiments, one being of single-point type (FIG. 2A) and the other of flash type (FIG. 2B)
Figure 2B:
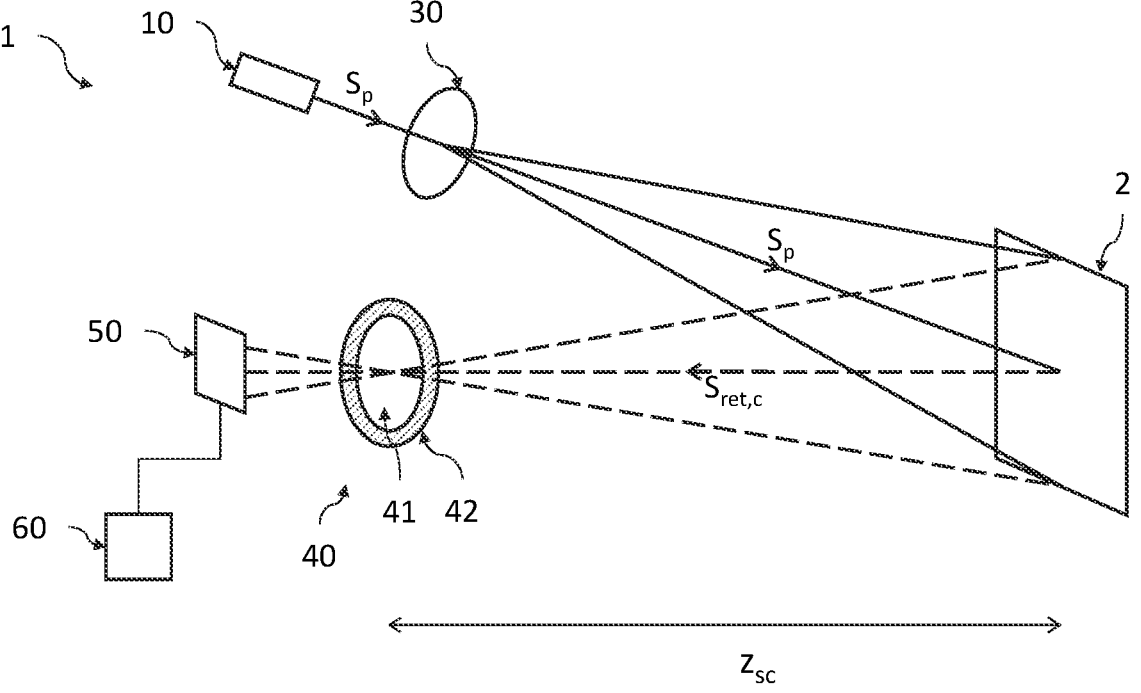

FIGS. 2A and 2B are schematic and partial views of an FMCW heterodyne-detection lidar imager system according to some embodiments, in which one corresponds to a single-point imager system, and the other corresponds to a flash imager system. The figures are highly schematic: the scene here is a flat surface, but it of course actually might not be.

Generally speaking, the imager system 1 comprises at least:

an optical source 10, designed to emit a coherent, continuous and frequency-modulated primary signal $S_p$ in order to illuminate the scene 2;

an optical collection element 41, designed to collect a portion, called collected signal $S_{ret,c}$, of a signal $S_{ret}$ backscattered by the scene 2 and originating from the primary signal $S_p$;

a photodetector 50, intended to receive a heterodyne signal $S_h$ associated with the collected signal $S_{ret,c}$;

a processing unit 60, designed to determine a distance $z_{sc}$ from the scene 2 based on a beat frequency of the heterodyne signal $S_h$.

To reduce the size of the imager system 1 and thus to be able to dispense with the optical splitting/recombining device, the imager system 1 according to the invention is designed to fully direct the primary signal $S_p$ to the scene 2. It additionally comprises a reflector 42 designed to reflect an uncollected portion $S_{ret,nc}$ of the backscattered signal $S_{ret}$ in the direction of the scene 2. Therefore, the signal $S_{ret,c}$ collected by the optical collection element 41 is formed of first light beams $S_{ret,c(1)}$ that have not been reflected by the reflector 42 (first echo), and of second light beams $S_{ret,c(2)}$ that have been reflected by the reflector 42 (second echo).

As a result, the photodetector 50 receives two optical signals $S_{ret,c(1)}$ and $S_{ret,c(2)}$ that are mutually coherent since they both originate from the same primary signal $S_p$, are backscattered by the scene 2, but that have an optical path difference from one another. They interfere with one another and form the heterodyne signal $S_h$, which has a beat frequency $f_b$.

The processing unit of the imager system 1 is then able to determine the distance $z_{sc}$ from the scene 2 based on the beat frequency $f_b$ of this heterodyne signal $S_h$, without having to use the reference signal $S_r$ of the local oscillator as in the prior art. As a result, there is no need to have an optical splitting/recombining device, meaning that the imager system 1 according to the invention has a smaller size.

It should be noted that fully directing the primary signal $S_p$ to the scene 2 is expressed by the fact that the optical power of the primary signal $S_p$ incident on the scene (at the illuminated surface of the scene 2) is equal to the optical power of the primary signal $S_p$ at the output of the optical source 10, obviously accounting for any small optical losses during the transmission of the primary signal $S_p$ to the scene 2. Consideration is given here to the power of the primary signal $S_p$ at the output of the optical source 10, which may be slightly less than that at the output of the laser source, in particular when the optical source 10 comprises optical elements (shaping of the light beam, optical filter, etc.) that may cause optical losses, as described further below.

FIG. 2A illustrates an imager system 1 according to a single-point embodiment. Therefore, the primary signal $S_p$ illuminates only one point of the scene 2 at a time, and the photodetector 50 may be a single photodiode (or a pair of balanced photodiodes). The imager system 1 is therefore designed to determine the distance $z_{sc}$ from the illuminated point of the scene 2. It should be noted that the imager system 1 may be designed to spatially sweep the scene 2 using the object signal $S_o$, point by point. According to the invention, it comprises a reflector 42, but does not comprise any splitting/recombining device such as the one illustrated in FIG. 1.

The imager system 1 comprises an optical source 10 for what is called a primary signal $S_p$, which is coherent, continuous and frequency-modulated. The optical source 10 comprises a laser source and may comprise additional optical elements (not shown) located downstream of the laser source.

The primary signal $S_p$ is frequency-modulated, for example linearly here, based on a starting frequency $f_0$ over a repetition period T with a bandwidth B (chirp). The signal here is a chirped signal, that is to say a sinusoidal wave the instantaneous frequency of which evolves linearly over time. By way of example, the primary signal $S_p$ may have an optical frequency located in the infrared.

In the case of emission in the near-infrared region (between 0.7 and 2 μm), the laser source may be a vertical-cavity surface-emitting laser (VCSEL) diode, which generally has a coherence length of the order of one meter, or even an edge-emitting laser (EEL) diode, which may have a coherence length of the order of around ten or even one hundred meters.

The optical source 10 has a coherence length typically greater than the optical path difference between the first echo $S_{ret,c(1)}$ and the second echo $S_{ret,c(2)}$. This optical path difference corresponds, in the first order, to twice the maximum distance between the imager system 1 and the scene 2.

According to the invention, unlike the prior art, the imager system 1 does not comprise any optical splitting/recombining device identical or similar to the one described with reference to FIG. 1. It therefore does not comprise any optical splitter element designed to split the primary signal $S_p$ into an object signal $S_o$, on the one hand, and into a reference signal $S_r$, on the other hand. There is therefore no reference signal $S_r$ of a local oscillator (LO) that would be directed toward the photodetector without passing through the scene 2, so as ultimately to interfere with the backscattered signal $S_{ret}$. It additionally also does not comprise any optical recombiner element designed to direct the reference signal $S_r$ and the collected portion $S_{ret,c}$ of the backscattered signal $S_r$ to the photodetector 50 along one and the same optical axis by at least partially spatially superimposing them.

As a result, the primary signal 10 is the signal that illuminates the scene 2, without it having been divided beforehand into a reference signal $S_r$ and into an object signal $S_o$. Therefore, as indicated above, the power of the primary signal $S_p$ at the output of the optical source 10 is identical to that of the same primary signal $S_p$ that illuminates the scene 2.

The imager system 1 comprises at least one optical collection element 41 for collecting a portion, denoted $S_{ret,c}$, of the signal $S_{ret}$ backscattered by the scene 2 and originating from the primary signal $S_p$, this collected signal $S_{ret,c}$ then being received by the photodetector 50. This may be a free-space optical element, and it may be an aperture diaphragm that defines the physical pupil. The aperture diaphragm may be defined by the contour of a focusing lens, in particular in the case of a flash imager system 1. The optical collection element may also be formed of multiple lenses between which the aperture diaphragm is arranged. The optical collection element 41 may also be defined by the sensitive surface of the photodetector 50, in particular in the case of a single-point imager system 1, in which case it is not a dedicated optical object.

Also according to the invention, the imager system 1 comprises a reflector 42 designed to reflect a portion, denoted $S_{ret,nc}$, of the backscattered signal $S_{ret}$, which has not been collected by the optical collection element 41, in the direction of the scene 2. The reflector 42 is in this case a specular reflector, in the sense that it reflects light beams non-diffusely or virtually non-diffusely. The reflector 42 may be located at the optical collection element 41, for example in a manner coplanar therewith, or be located upstream or downstream. As described further below, it may also be located at the photodetector 50.

As described further below, the reflector 42 may be simply reflective, that is to say that it reflects incident light beams in accordance with Snell-Descartes' law of reflection, or be retroreflective, that is to say that light beams are reflected along an axis of reflection identical to the axis of incidence. In this regard, the reflector 42 may be a mirror with corner cubes or a layer of microbeads, as described in particular in document WO2015/158999A1.

The optical collection element 41 preferably has small lateral dimensions in comparison with the distance between this assembly and the scene 2, such that the first and second echoes $S_{ret,c(1)}$ and $S_{ret,c(2)}$ pass physically through virtually the same optical path. They are therefore collected along virtually the same optical axis and with good spatial superposition, thus improving the combination of the two optical signals through interference, thereby making it possible to improve the strength of the heterodyne signal $S_h$.

The imager system 1 furthermore comprises a photodetector 50, which is a photodiode here (or for example a pair of balanced photodiodes) insofar as the imager system 1 is of single-point type. It receives not the reference signal $S_r$ of a local oscillator, but a first echo $S_{ret,c(1)}$ and a second echo $S_{ret,c(2)}$ of the signal $S_{ret}$ backscattered by the scene 2 and collected by the optical collection element 41, which interfere with one another so as to form the heterodyne signal $S_h$, which has a beat frequency $f_b$.

The imager system 1 comprises a processing unit 60 designed to determine the distance $z_{sc}$ from the illuminated point of the scene 2 based on the beat frequency $f_b$ of the heterodyne signal $S_h$ received by the photodetector 50. The distance $z_{sc}$ is in this case the distance between the scene 2 and the reflector 42.

Before describing the operation of the imager system 1, it should be noted that the invention also covers the configuration of the flash imager system 1 in which multiple points of the scene 2 are illuminated simultaneously by the same primary signal $S_p$.

In this regard, FIG. 2B illustrates such an imager system 1, similar to the one from FIG. 1, but that differs therefrom in that it does not comprise any optical splitting/recombining device, and in that it comprises a reflector 42 designed to reflect a portion $S_{ret,nc}$ of the backscattered signal $S_{ret}$, not collected by the optical collection element 41, in the direction of the scene 2.

By way of example, the optical source 10 may comprise passive optical elements (not shown) located downstream of the laser source. Provision may thus be made for a shaping lens that makes it possible to collimate the optical beam while at the same time enlarging its lateral dimension, for example to a diameter of a few millimeters. In addition, a spatial filtering device may be present to eliminate high spatial frequencies. The primary signal $S_p$ thus propagates in a collimated manner with a Gaussian profile and a diameter of the order of a few millimeters, for example 5 mm. It then has an optical power that is substantially the same at the illuminated scene.

Unlike the imager system 1 from FIG. 2A, the imager system 1 according to this variant comprises an optical projection device 30 for projecting the primary signal $S_p$ in the direction of the scene 2 so as to illuminate it simultaneously. It also comprises an optical imaging device 40 designed to transmit the portion $S_{ret,c}$ of the backscattered signal $S_{ret}$ and to form the image of the illuminated scene 2 in the detection plane of the photodetector 50. These optical devices are similar to those described in document WO2021/144357A1 and are therefore not described in detail here. It should be noted that the imager system 1 also does not comprise the optical shaping element 22 for shaping the reference signal $S_r$ described in FIG. 1.

Finally, the photodetector 50 is a matrix photodetector, and comprises a matrix of detection pixels extending in a reception plane. It may be a CMOS photodetector (or even a CCD photodetector). The reception plane of the matrix photodetector 50 is located in a conjugate plane of the scene by the optical imaging device 40 (to within the depth of field insofar as the scene is not necessarily a flat surface). In other words, the image of the scene 2 is formed in the reception plane of the matrix photodetector 50. Each detection pixel is intended to receive the heterodyne signal $S_h$.

Figure 3A:
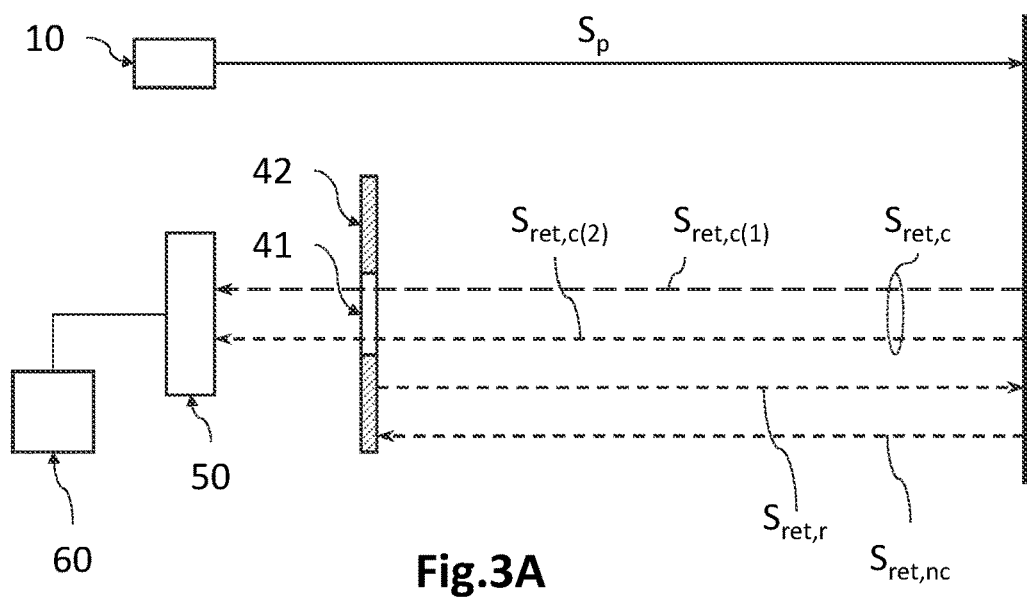
FIG. 3A is a schematic and partial view of an imager system according to one embodiment similar to that of FIG. 2A, in which the various optical signals are highlighted, in particular the light beams $S_{ret,c(1)}$ that form a first echo and the light beams $S_{ret,c(2)}$ that form a second echo.
Figure 3B:
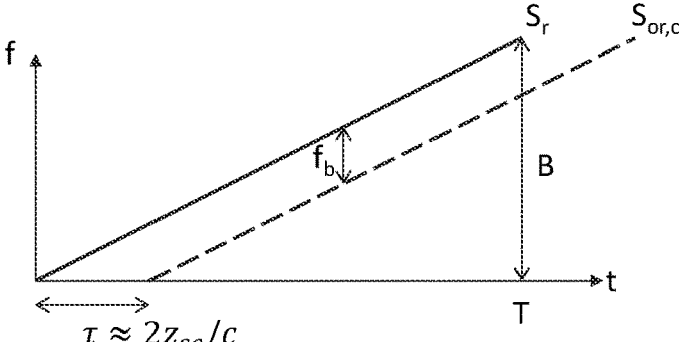
FIGS. 3B and 3C illustrate an evolution of the optical frequency of various signals, thus highlighting the beat frequency $f_b$ of the heterodyne signal $S_h$, in the case of an imager system according to one example from the prior art (FIG. 3B) and in the case of an imager system according to one embodiment of the invention (FIG. 3C)
Figure 3C:
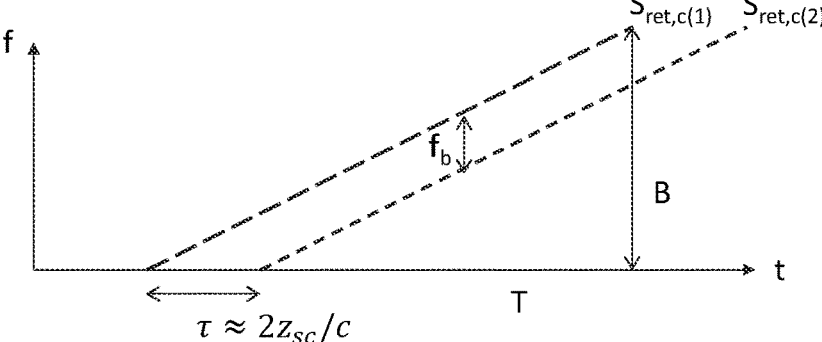

The operation of the imager system 1 is now described with reference to FIGS. 3A, 3B and 3C, where FIG. 3A is a schematic and partial view of an imager system 1 similar to the one from FIG. 2A, highlighting the various optical signals that are present, and where FIGS. 3B and 3C illustrate the temporal evolution of the frequency of various optical signals, highlighting the beat frequency $f_b$, in the case of the prior art (FIG. 3B) and in the case of the invention (FIG. 3C).

The optical source 10 emits the coherent, continuous and frequency-modulated primary signal $S_p$, which is directed fully to the scene 2. Therefore, the power of the optical signal illuminating the scene 2 is equal to that at the output of the optical source 10.

The scene 2 backscatters a portion of the primary signal $S_p$, which then forms the backscattered signal $S_{ret}$. This comprises a portion $S_{ret,c}$ that is collected by the optical collection element 41, and a portion $S_{ret,nc}$ that is not collected by this optical collection element 41. Indeed, the scene 2 usually has a component that is at least partially diffuse at reflection, that is to say that light is reflected with a relatively wide angular indicatrix. Therefore, the light backscattered by the scene 2 illuminates the optical collection element 41, but also a portion of the space surrounding this optical collection element. Therefore, the uncollected portion $S_{ret,nc}$ may be reflected by the reflector 42 in the direction of the scene 2, thereby forming, in return, the reflected signal $S_{ret,r}$, a portion of which is then backscattered again by the scene 2 and then collected by the optical collection element 41.

As a result, the optical collection element 41 collects a portion $S_{ret,c}$ of the backscattered signal $S_{ret}$, which is then formed of light beams $S_{ret,c(1)}$ that have been collected directly without having been reflected by the reflector 42 (first echo), and of light beams $S_{ret,c(2)}$ that have been reflected by the reflector 42 before then being collected (second echo).

It should be noted that collected portion $S_{ret,c}$ is the name given to the light beams that have been or will be collected by the optical collection element 41. The signals $S_{ret,c(1)}$ and $S_{ret,c(2)}$ are directed in the direction of the photodetector 50 along the same optical axis and in a manner at least partially superimposed on one another, all the more so when the lateral dimensions of the optical collection element 41 are small in relation to the distance between this element 41 and the scene 2. The signals $S_{ret,c(1)}$ and $S_{ret,c(2)}$ then interfere with one another and form the heterodyne signal $S_h$.

The second echo $S_{ret,c(2)}$ has an amplitude that is generally less than that of the first echo $S_{ret,c(1)}$, all the more so the smaller the diffuse reflectance factor of the scene, and where the reflector 42 does not collect all of the light backscattered by the scene 2 and not collected by the optical collection element 41.

With reference to FIG. 3B, in the case of an imager system from the prior art such as the one from FIG. 1, the beat frequency $f_b$ results from the optical path difference between the reference signal $S_r$ and the backscattered and collected object signal $S_{or,c}$ (which corresponds to the first echo $S_{ret,c(1)}$, which is, in the first order, equal to a round trip between the scene 2 and the imager system 1. It is possible to write $f_b/B = \tau/T$. In addition, in the knowledge that $\tau = 2z_{sc}/c$ when ignoring the distance $z_r$ from the reference path in relation to $z_{sc}$, it is then possible to determine the distance $z_{sc}$ such that $z_{sc} = f_b cT/2B$.

With reference to FIG. 3C, in the case of an imager system 1 according to one embodiment of the invention, the beat frequency $f_b$ results from the optical path difference between the first echo $S_{ret,c(1)}$ and the second echo $S_{ret,c(2)}$, which is equal, in the first order, in this case too, to a round trip between the scene 2 and the imager system 1. It is therefore possible to write $f_b/B = \tau/T$ where $\tau = 2z_{sc}/c$, and therefore determine the distance $z_{sc}$ such that $z_{sc} = f_b cT/2B$.

The processing unit 60 then determines the beat frequency $f_b$ of the detected heterodyne signal $S_h$, and then deduces the distance $z_{sc}$ from the scene 2 therefrom. The beat frequency $f_{b(2)}$ may be determined, as is known, in the time domain by counting the number of oscillations of the heterodyne signal over the period T, or in the frequency domain through a fast Fourier transform.

Therefore, the imager system 1 according to the invention has a smaller size in that, due to the presence of the reflector 42, it does not comprise any optical splitting/recombining device that is present in the imager systems from the prior art. Therefore, it thus does not comprise any optical splitter element for dividing the primary signal $S_p$ into the reference signal $S_r$ and the object signal $S_o$, or any optical recombiner element for recombining the reference signal $S_r$ with the backscattered object signal $S_{or}$. In the case of a flash imager system (see also single-point imager system), it also does not comprise the optical shaping element for shaping the reference signal $S_r$. This thus avoids the photometric losses associated with these optical elements.

This advantage is obtained by collecting, in addition to the first echo $S_{ret,c(1)}$, the second echo $S_{ret,c(2)}$ of the backscattered signal $S_{ret}$, which has been reflected by the reflector 42 and then backscattered again by the scene 2. Moreover, the beat frequency $f_b$ remains substantially equal to that measured in the prior art, meaning that the imager system 1 according to the invention uses a processing unit 60 that may remain unchanged with respect to that from the prior art.

It should be noted that the imager system 1 according to the invention therefore does not comprise a reference signal $S_r$ of a local oscillator, insofar as the two signals $S_{ret,c(1)}$ and $S_{ret,c(2)}$ are backscattered by the scene 2, and that the optical paths of the signals vary when the distance $z_{sc}$ varies, this not being the case in an imager system according to the prior art, in which the optical path of the reference signal $S_r$ does not pass through the scene and remains independent of the distance $z_{sc}$.

Figure 4A:
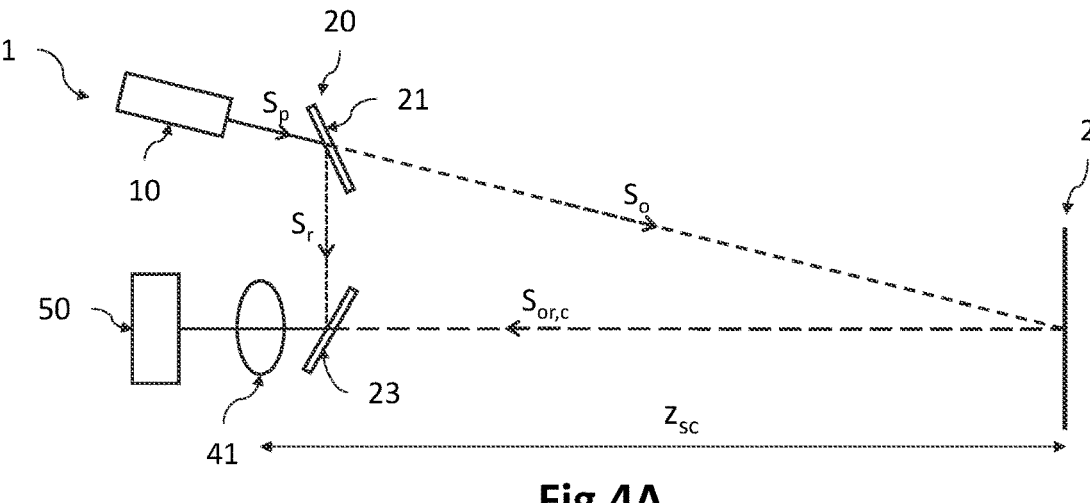
Figure 4B:
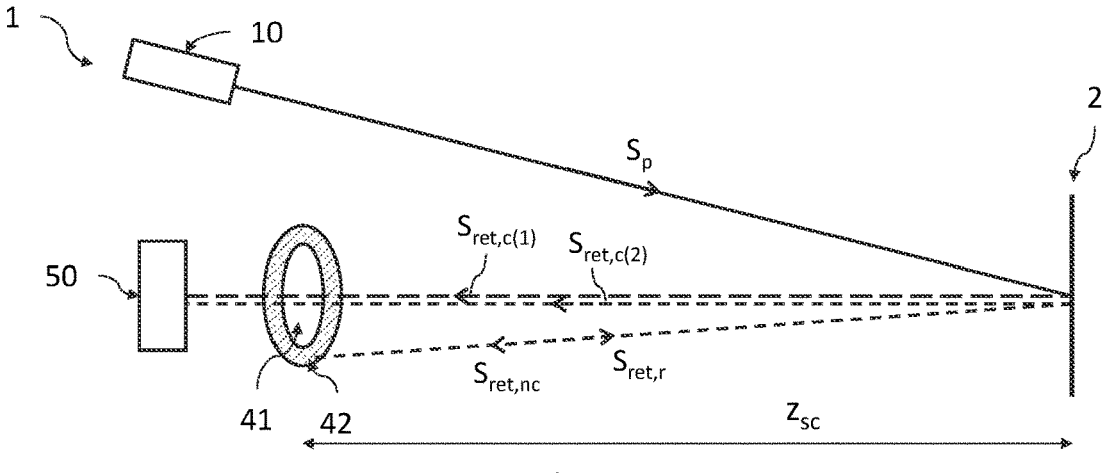
Figure 4C:
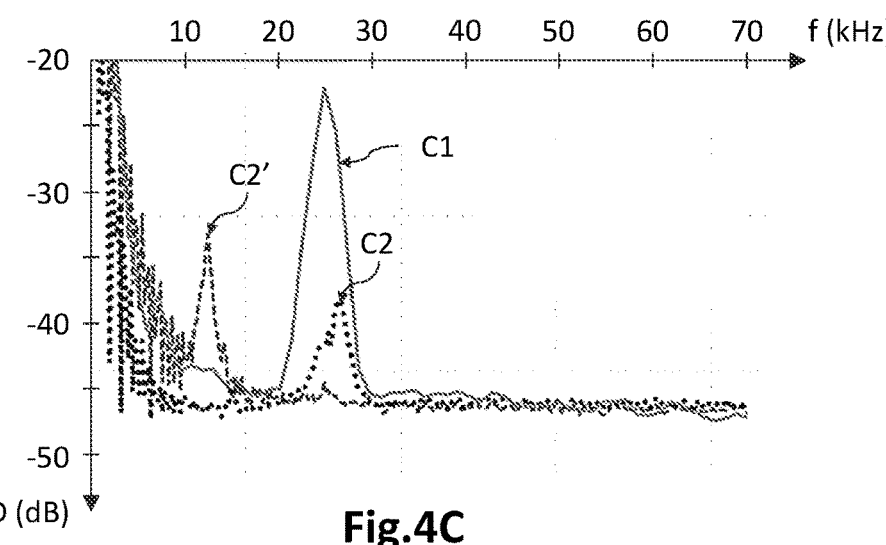

A description is now given, with reference to FIGS. 4A to 4C, of one specific example of determining the beat frequency $f_b$ of the heterodyne signal $S_h$, here through FFT, in the case of a single-point imager system from the prior art (FIG. 4A) and in the case of an imager system according to the invention, also of single-point type here (FIG. 4B). FIG. 4C shows the power spectral density, highlighting the beat frequency $f_b$ in these two cases.

In this example, the primary signal $S_p$ has a wavelength $\lambda$ of 633 nm, a chirp B equal to 12 GHz for a period T equal to 1.6 ms, and the scene is located at a distance $z_{sc}$ of 50 cm. The scene 2 is formed of a frosted silicon plate, exhibiting semi-diffusive behavior at reflection.

FIG. 4A shows the imager system according to the prior art. It therefore comprises an optical splitting/recombining device 20 formed of an optical splitter element 21 and of an optical recombiner element 23. The primary signal $S_p$ is therefore divided by the optical splitter element 21 into a reference signal $S_r$ and into an object signal $S_o$. Next, the backscattered object signal $S_{or,c}$ is transmitted and spatially superimposed on the reference signal $S_r$ by the optical recombiner element 23, and collected by the optical collection element 41. In this example, the optical collection element 41 is located between the optical recombiner element 23 and the photodetector. FIG. 4B shows the imager system according to the invention, in this case similar to the one described with reference to FIG. 2A. It is therefore not described again.

With reference to FIG. 4C, the curve C1 in an unbroken line represents the power spectral density associated with the imager system from the prior art (FIG. 4A). The measured beat frequency $f_b$ is equal here to 25 kHz, complying with the theoretical relationship $f_b=2Bz_{sc}/cT$.

Moreover, the curve C2 in short dashed lines represents the power spectral density associated with the imager system according to the invention (FIG. 4B). The measured beat frequency $f_b$ is equal here to 26 kHz, also complying with the theoretical value=$2Bz_{sc}/cT$. As expected, the amplitude of this signal is less than that obtained with the imager system from the prior art.

Finally, the curve C2' in long dashed lines represents the power spectral density associated with the imager system according to the invention (FIG. 4B), but for a distance $z_{sc}$=25 cm. The measured beat frequency $f_b$ is equal here to 13 kHz, this confirming that the 26 GHz signal is not an experimental artefact.

FIGS. 5A to 5D are schematic views of the reflector 42 according to various variant embodiments.

The reflector 42 may be located at the optical collection element 41, for example in a manner coplanar therewith, and have a ring (crown) shape continuously surrounding it (cf. FIG. 5A). It may be formed of annular segments partially surrounding the optical collection element 41. As a variant, it may have any shape, in this case square, joined or not joined to the optical collection element 41 (FIG. 5B).

The reflector 42 might not be located in the plane of the optical collection element 41, and may be located upstream or downstream thereof. For example, it may be located at the photodetector, i.e. in the plane or close to the detection plane, whether the photodetector 50 is a photodiode or a matrix photodetector. In this regard, FIG. 5C illustrates the situation in which the photodetector is a matrix photodetector (flash imager system 1) and comprises a matrix of detection pixels 51 with a fill factor less than unity; the reflector 42 may be located in the non-photosensitive regions of the matrix of detection pixels 51. In this scenario and when the reflector 42 is retroreflective, the corner cubes preferably have a lateral dimension much greater than the wavelength, for example more than 10 times the wavelength of the primary signal, such that the corner cubes do not diffract.

Moreover, the reflector 42 may be formed of a continuously reflective or retroreflective surface, or be formed of reflective or retroreflective surfaces 42.2 that are not contiguous and separated from one another by a surface 42.1 transparent or reflective to the wavelength of the optical signals of interest, as illustrated in FIG. 5D. If the surface 42.1 is transparent, this embodiment is particularly beneficial when the reflector 42 is located upstream of the optical collection element 41 and is passed through by the optical collection axis (cf. FIGS. 8A and 8B). In this regard, the reflector 42 may be formed of a central surface that is passed through by the optical collection axis, comprising the reflective or retroreflective surfaces 42.2 separated from one another and surrounded by a transparent surface 42.1, and of a peripheral surface that surrounds the central surface, wherein the reflective or retroreflective surfaces 42.2 are joined to one another.

Figure 6A:
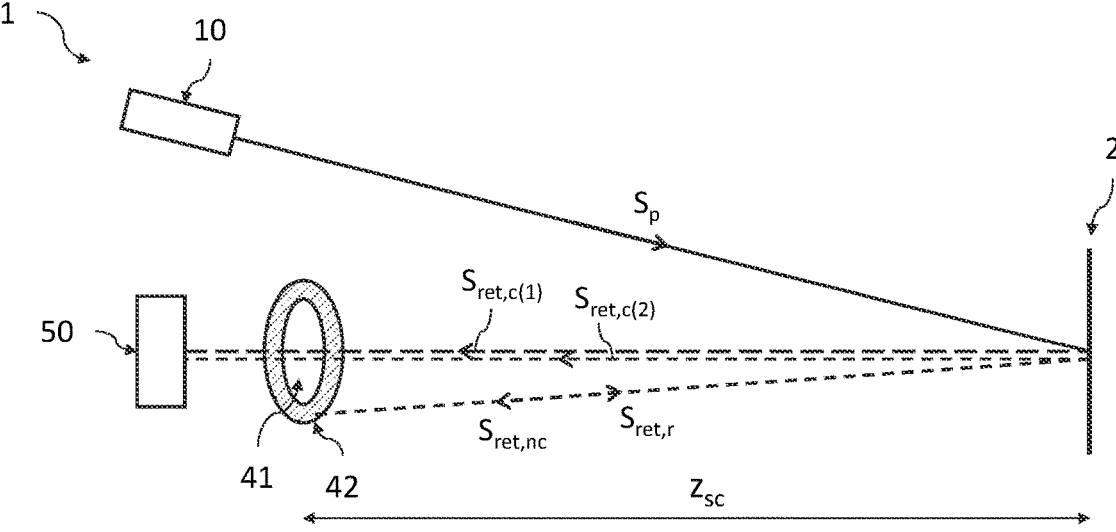
FIG. 6A is a schematic and partial view of an imager system according to one embodiment, of single-point type and in which the reflector is retroreflective.
Figure 6B:
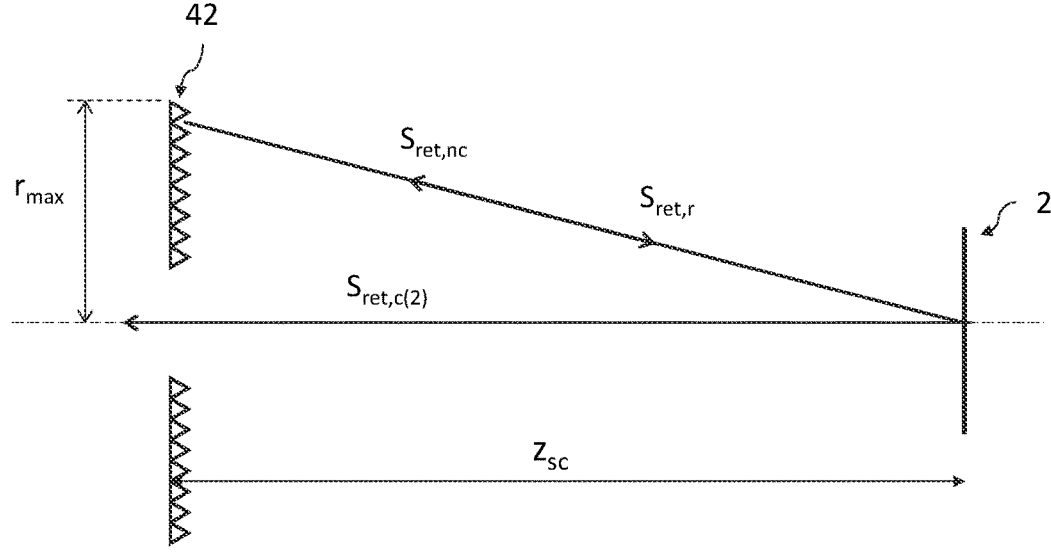
FIG. 6B is a detailed view of FIG. 6A highlighting the backscattered and uncollected signal $S_{ret,nc}$, the reflected signal $S_{ret,r}$ and the second echo $S_{ret,c(2)}$.

FIG. 6A is a schematic and partial view of an imager system 1 according to a single-point embodiment, wherein the reflector 42 is retroreflective. FIG. 6B illustrates a detail of FIG. 6A so as to highlight a condition on the maximum distance $r_{max}$ from the lateral edge of the reflector 42 to the optical collection axis.

According to one embodiment, the reflector 42 is retroreflective, in the sense that incident light beams are reflected with an axis of reflection identical to the axis of incidence. The light beam backscattered by a point of the scene 2 and reflected by the retroreflective reflector 42 is thus returned to this same point of the scene 2 or immediate proximity. Therefore, such a reflector 42 makes it possible not to mix, among the light beams of the collected signal $S_{ret,c}$, light beams coming from multiple different points of the scene 2, and therefore not to worsen the lateral resolution of the imager system 1. In the case of a single-point imager system 1, this allows the determination of the distance $z_{sc}$ not to be subject to interference by light beams coming from objects located at other distances. And, in the case of a flash imager system 1, this thus avoids worsening the quality or the spatial resolution of the determined distance map.

The reflector 42 is arranged facing the optical axis of the optical collection element 41, such that it has an outer lateral edge located at a maximum distance $r_{max}$ from this optical axis. Preferably, this maximum distance $r_{max}$ is less than $\sqrt{(cz_{sc}/B)}$, so as not to worsen the distance resolution $\Delta z_{sc}$ of the imager system 1. Indeed, as illustrated in FIG. 6B, a light beam of the uncollected portion $S_{ret,nc}$ that might be retroreflected at the edge of the reflector 42, and then backscattered along the optical axis of the optical collection element 41, would then cover a distance $z_{sc}+\sqrt{(z_{sc}^2+r_{max}^2)}$, and not $2z_{sc}$, which would cause an error of the order of $r_{max}^2/2z_{sc}$ under the assumption that $r_{max} \ll z_{sc}$. Therefore, this error $r_{max}^2/2z_{sc}$ should advantageously be less than the distance resolution $\Delta z_{sc}$ equal to c/2B, which leads to the condition $r_{max} < \sqrt{(cz_{sc}/B)}$. It should be noted that this condition is not that restrictive, insofar as $r_{max}<15$ cm is obtained for $z_{sc}$=50 cm and B=7 GHz.

The reflector 42 has a surface designed to maximize the number of photons of the signal $S_{ret,nc}$ that are intercepted and then reflected, thereby accordingly increasing the amplitude of the second echo $S_{ret,c(2)}$ and therefore the distance range of the imager system 1, without otherwise impacting the compactness of the reception module of the imager system 1. Whatever the case, it is advantageous for the reflector 42 to have dimensions that comply with the above-mentioned condition on the maximum distance $r_{max}$ from the lateral edge.

Figure 7A:
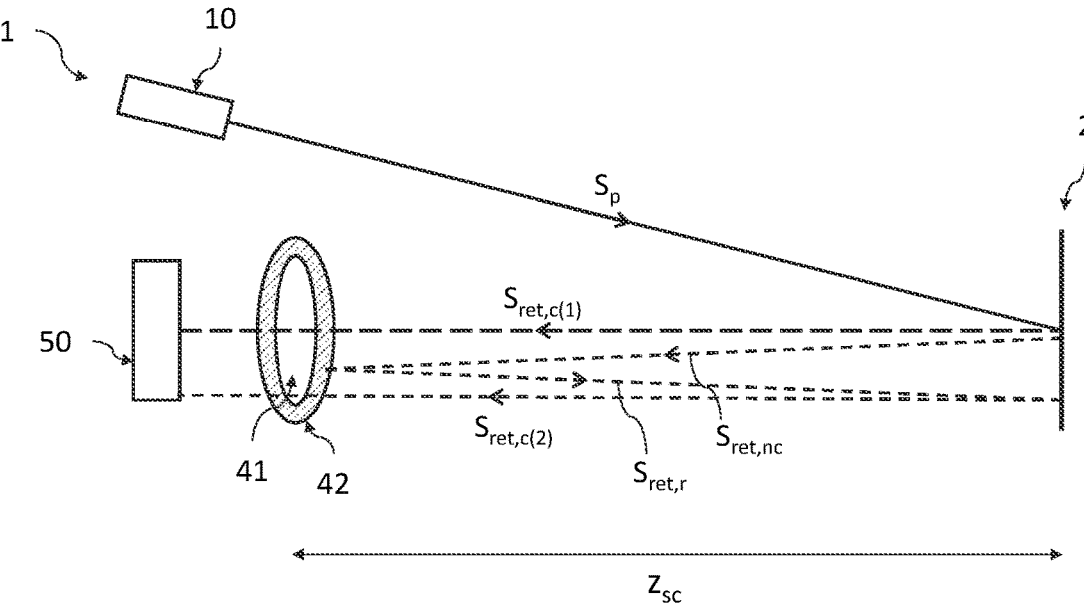
FIG. 7A is a schematic and partial view of an imager system according to one embodiment, of single-point type and in which the reflector is not retroreflective.
Figure 7B:
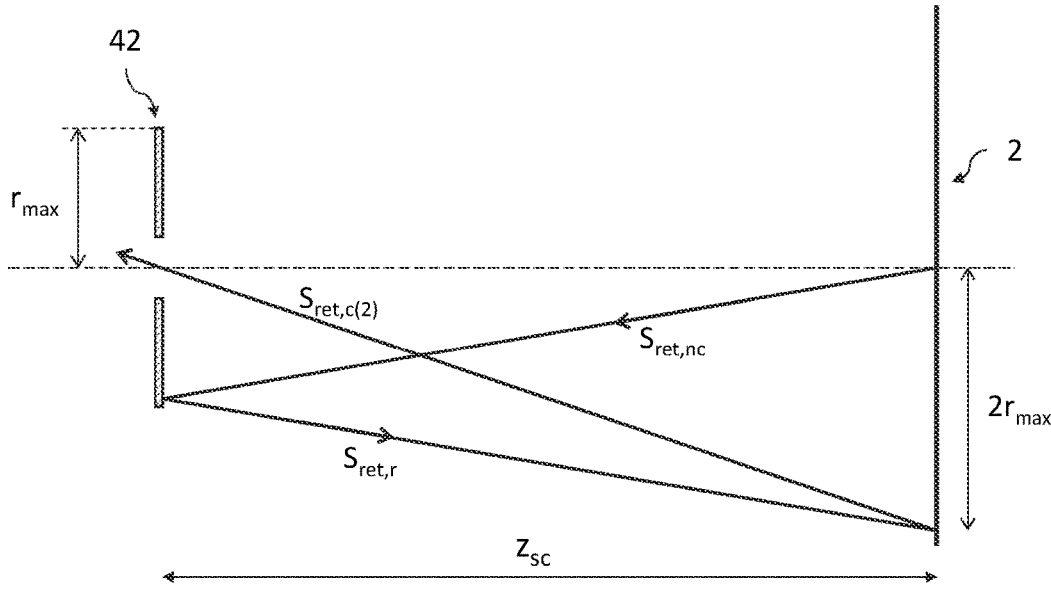
FIG. 7B is a detailed view of FIG. 7A highlighting the backscattered and uncollected signal $S_{ret,nc}$, the reflected signal $S_{ret,r}$ and the second echo $S_{ret,c(2)}$.

FIG. 7A is a schematic and partial view of an imager system 1 according to one embodiment, wherein the reflector 42 is not retroreflective, that is to say only reflective. FIG. 7B illustrates a detail of FIG. 7A so as to highlight a condition on the maximum distance $r_{max}$ from the lateral edge of the reflector 42 to the optical collection axis.

A light beam incident on the reflector 42 is therefore not reflected along an axis of reflection identical to the axis of incidence, but follows Snell-Descartes' law of reflection. It is therefore reflected in the direction of a point other than the one from which the light beam of the portion $S_{ret,nc}$ of the backscattered signal $S_{ret}$ originates. For a light beam that is reflected from the reflector 42 at the distance $r_{max}$, it is noted that the distance between these two points of the scene is of the order of $2r_{max}$ (for a scene substantially perpendicular to the optical axis). As a result, the previous condition on the distance $r_{max}$ from the outer lateral edge of the reflector 42 is modified and becomes: $r_{max} < \sqrt{(cz_{sc}/3B)}$. This condition still remains non-restrictive, since $r_{max} < 8.5$ cm is obtained if $z_{sc} = 50$ cm and B=7 GHz. Whatever the case, it is preferable to reserve the use of a non-retroreflective reflector 42 for a single-point imager system 1. Moreover, care should be taken to ensure that the angular separation between the two illuminated points of the scene 2 remains less than the iFOV (individual field of view) angular resolution of the optical collection element 41, with the condition $2a\ tan(r_{max}/z_{sc}) < iFOV$, so as not to worsen lateral resolution. It should be noted that the field of view (FOV) of the optical collection element 41 is the angle at which the photodetector 50 is sensitive to the portion $S_{ret,c}$ of the signal $S_{ret}$ backscattered through the optical collection element 41.

Figure 8A:
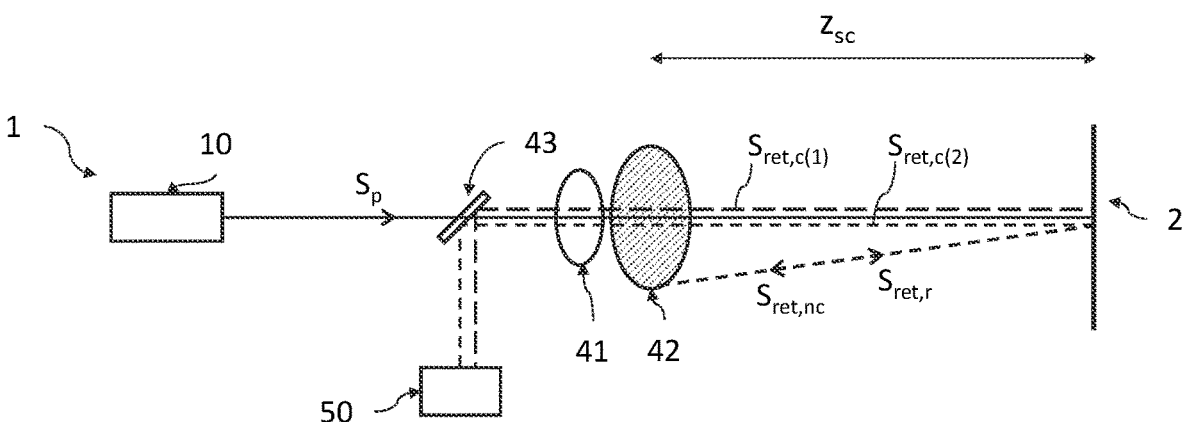
FIGS. 8A and 8B are schematic and partial views of an imager system according to some embodiments, in which the reflector is located upstream of the optical collection element and is passed through by the optical axis thereof, in a monostatic configuration (FIG. 8A) and in a bistatic configuration (FIG. 8B).

According to one embodiment, the imager system 1 may have what is called a monostatic configuration, in the sense that the optical axis of the illumination of the scene 2 and the optical collection axis are collinear. In this regard, FIG. 8A is a schematic and partial view of such an imager system 1, here of single-point type, but this configuration may also be implemented for a flash imager system 1. Moreover, the reflector 42 is retroreflective here and is located upstream of the optical collection element 41, in the sense that the optical collection axis passes through the reflector 42. Therefore, this is at least partially reflective or retroreflective, and is formed of reflective or retroreflective surfaces that are not contiguous and are separated from one another by a transparent surface (cf. the example of FIG. 5D).

The imager system 1 here comprises a semi-reflective plate 43 (or a splitter cube) placed on the optical path of the primary signal $S_p$, and the optical collection element 41 (and the reflector 42) is located between the scene 2 and the plate 43. It is also possible, instead of the semi-reflective plate 43, to use a polarization splitter cube combined with a quarter-wave plate, which makes it possible to reduce optical losses. This optical assembly forms an optical isolator for avoiding light from being backscattered to the laser source (and therefore avoiding any overheating of the laser source).

The primary signal $S_p$ is thus transmitted in the direction of the scene 2 by the semi-reflective plate 43. A portion $S_{ret,c(1)}$ (first echo) of the backscattered signal $S_{ret}$ is collected by the optical collection element 41 and then reflected by the semi-reflective plate 43 in the direction of the photodetector 50. A portion $S_{ret,nc}$ of the backscattered signal $S_{ret}$ is not collected by the optical collection element 41, but is retroreflected by the reflector 42, and is then collected by the optical collection element 41 (second echo), and is then reflected by the semi-reflective plate 43 in the direction of the photodetector 50. The two echoes $S_{ret,c(1)}$ and $S_{ret,c(2)}$ interfere so as to form the heterodyne signal $S_h$ detected by the photodetector 50.

The imager system 1 has the advantage here of facilitating the detection and the determination of the distance $z_{sc}$ of objects having a high specular component, that is to say that light is backscattered by the object in question from the scene in a backscatter cone (angular distribution of the backscattered luminous intensity) centered on a main direction, this direction possibly being close to the specular reflection direction. Indeed, in the case of a bistatic imager system 1 presented above (FIG. 2A-2B and FIG. 6A-7A), the second echo $S_{ret,c(2)}$ could be backscattered mainly in the direction of the optical source 10, and slightly in the direction of the optical collection element 41, thus reducing the strength of the collected signal $S_{ret,c(2)}$, and therefore the ability of the imager system 1 to detect this type of object in the scene 2. This is not the case for a monostatic imager system 1, insofar as the second echo $S_{ret,c(2)}$ is returned mainly to the optical collection element 41 and the reflector 42 (narrow angular indicatrix). Moreover, this monostatic configuration for an imager system 1 has the advantage of reducing or even eliminating shadowing phenomena in the determined distance map, by the very fact that these two optical axes are coincident.

Figure 8B:
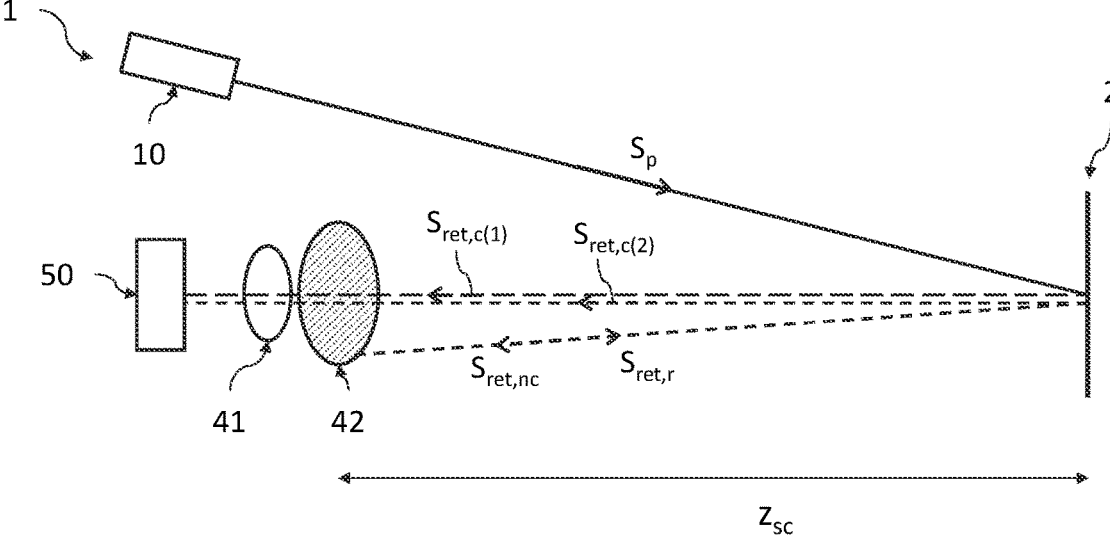

FIG. 8B is a schematic and partial view of an imager system 1 according to another single-point embodiment with a bistatic configuration, similar to the one from FIG. 6A, in which the reflector 42 is also located upstream of the optical collection element 41.

Particular embodiments have just been described. Various modifications and variants will be obvious to anyone skilled in the art. The imager system 1 may thus have a free-space configuration such as a guided-optic configuration, as described in document WO2021/144357A1 mentioned above.

The invention claimed is:

1. An FMCW lidar imager system, configured to determine a distance $z_{sc}$ between the FMCW lidar imager system and a scene, comprising:

an optical source, configured to emit a coherent, continuous and frequency-modulated primary signal in order to illuminate the scene;

an optical collection element, configured to collect a portion, called collected signal, of a signal backscattered by the scene and originating from the primary signal;

a photodetector, intended to receive a heterodyne signal associated with the collected signal;

a processing unit, configured to determine the distance $z_{sc}$ from the scene based on a beat frequency of the heterodyne signal;

wherein the FMCW lidar imager system is configured to fully direct the primary signal to the scene;

and wherein the FMCW lidar imager system comprises a reflector configured to reflect in the direction of the scene, a portion, called uncollected signal, of the backscattered signal, not collected by the optical collection element, the collected portion of the backscattered signal then being formed of first light beams that have not been reflected by the reflector and of second light beams that have been reflected by the reflector and then by the scene;

the heterodyne signal then being formed by an interference between the first light beams and the second light beams.

2. The imager system as claimed in claim 1, wherein the reflector is retroreflective, so as to reflect incident light beams in the direction of the scene along an axis of reflection identical to their axis of incidence.

3. The imager system as claimed in claim 1, wherein the reflector has a lateral edge located at a maximum distance from an optical axis of the optical collection element, and is dimensioned such that the maximum distance is less than $\sqrt{(cz_{sc}/B)}$ when the reflector is retroreflective, where c is the speed of light in a vacuum, and B is a variation in the frequency of the primary signal over a period T of the modulation, and such that the maximum distance is less than $\sqrt{(cz_{sc}/3B)}$ when the reflector is not retroreflective.

4. The imager system as claimed in claim 1, wherein the reflector is located in a plane of the optical collection element.

5. The imager system as claimed in claim 1, wherein the reflector is located downstream of the optical collection element at the photodetector.

6. The imager system as claimed in claim 1, wherein the reflector is located upstream of the optical collection element with an optical collection axis that passes through the reflector, the reflector then being formed of reflective or retroreflective surfaces separated from one another and surrounded by a surface transparent to the wavelength of the primary signal.

7. The imager system as claimed in claim 6, wherein the reflector comprises a central surface that is passed through by the optical collection axis, wherein the central surface is formed of reflective or retroreflective surfaces separated from one another and surrounded by a transparent surface, and a peripheral surface that surrounds the central surface, wherein the reflective or retroreflective surfaces are joined to one another.

8. The imager system as claimed in claim 1, configured to illuminate only one point of the scene, or configured to simultaneously illuminate a plurality of points of the scene and then comprising an optical projection device for projecting the primary signal onto the scene in order to simultaneously illuminate the plurality of points of the scene and an optical imaging device configured to form an image of the illuminated scene in a plane of the photodetector.

9. The imager system as claimed in claim 1, having what is called a monostatic configuration in which an optical axis of the illumination of the scene by the primary signal is identical to an optical collection axis of the optical collection element, and comprising a semi-reflective plate or a splitter cube transmitting the primary signal toward the scene and reflecting the backscattered signal toward the photodetector.

10. The imager system as claimed in claim 1, having what is called a bistatic configuration in which an optical axis of the illumination of the scene by the primary signal is different from an optical collection axis of the optical collection element.

* * * * *